United States Patent [19]
Eberle et al.

[11] 3,757,065
[45] Sept. 4, 1973

[54] DEVICE FOR INDICATING THE LOADING OF A VEHICLE SEAT

[75] Inventors: Dieter Eberle, Tamm/Wurttemberg;
Dieter Hanselmann; Hans Prohaska, both of Bietigheim/Wurttemberg, all of Germany

[73] Assignee: SWF-Spezialfabrik Fur Autozubehor Gustav Rau GmbH, Postfach, Bietigheim, Germany

[22] Filed: Apr. 20, 1972

[21] Appl. No.: 245,907

[30] Foreign Application Priority Data
Apr. 22, 1971 Germany.................. P 71 15 514.1

[52] U.S. Cl. .............................. 200/85 A, 340/278
[51] Int. Cl. ............................................. H01h 3/14
[58] Field of Search ......... 200/85 A, 85 R, 61.58 B; 307/10 SB; 340/278

[56] References Cited
UNITED STATES PATENTS
3,437,993   4/1969   Recio et al................ 340/278
3,375,495   3/1968   Burns........................... 200/61.58 B
3,297,841   1/1967   Campbell..................... 200/61.58 B Primary Examiner—David Smith, Jr.
Attorney—John J. Mc Glew et al.

[57] ABSTRACT

A device for indicating a load on a seat, such as whether it is occupied by a passenger of a motor vehicle comprises, a seat having an interior spring suspension with an indicator switch secured to the suspension and depending therefrom. The indicator switch includes an actuator member which is held in one operating position by a cable which is connected to the actuating member and tensioned by a connection to the spring suspension frame of the seat. The cable holds the actuator member in a position, for example, in which the switch is actuated, and a return spring acts to move the actuating member in an opposite direction to a de-actuated position when the seat is loaded which causes the indicator to flex with the seat spring and move in a direction to relax the tension on the holding cable.

9 Claims, 1 Drawing Figure

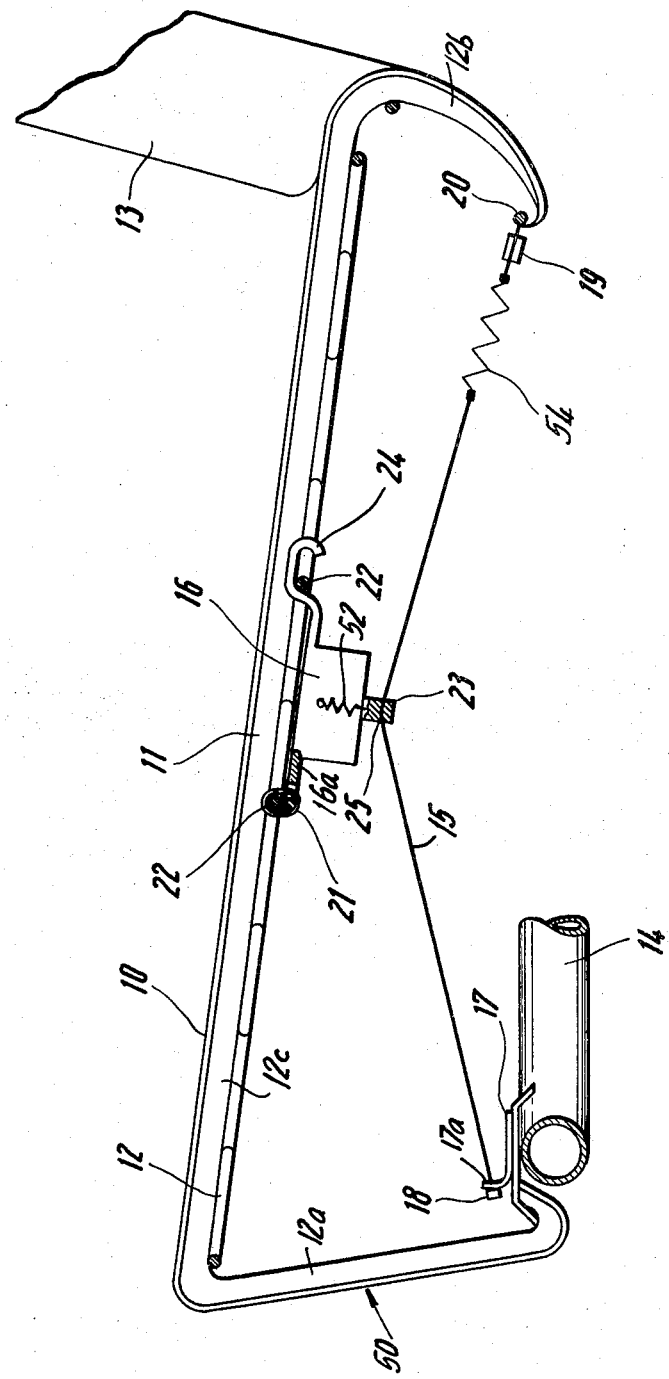

DEVICE FOR INDICATING THE LOADING OF A VEHICLE SEAT

BACKGROUND OF THE INVENTION

1. Field of the Invention

This invention relates in general to automobile safety devices and, in particular, to a new and useful device for indicating the presence of a load on a seat of an automobile vehicle.

2. Description of the Prior Art

In order to increase the safety of persons which are conveyed in vehicles, it has been considered advisable to give the driver a signal when a person has occupied a passenger seat and has not fastened the safety belt. In order to produce such a signal, it is desirable to have an indicator or actuator which is actuated when an automobile vehicle seat is loaded. The known devices are either complicated in construction, or unreliable.

SUMMARY OF THE INVENTION

In accordance with the invention, the vehicle includes a seat which is constructed as a rigid member which includes a frame with a spring suspension supporting the horizontally extending seat part and with downwardly extending leg portions at each end for mounting the seat frame on the floor of the vehicle. The spring suspension, which includes the upholstery and seat cover, is mounted on the seat frame. In accordance with the invention, an actuator device in the form of a pull switch is secured to the underside of the suspension directly below the horizontally extending seat portion so that the pull switch is moved entirely with the flexing of the seat under load. An actuating member of the switch is biased in a return upward direction and a cable on the tension engages the actuating member and biases it to an opposite, for example, an actuated position. The tension on the cable is released when the spring suspension is subjected to load and sags to cause the movement of the switch in a direction of the cable to release the tension of the cable. A switch device of the vehicle will be actuated even when the seat is loaded unevenly. The switch is of simple design and may be attached to the existing vehicle seats.

The pull switch itself may be easily installed to the underside of the horizontal seat suspension by forming the switch with a hook-shaped end which engages around the spring bar elements and which includes a clamping sleeve which secures the opposite end to the underside of the spring suspension.

The tension cable comprises an inexpensive flexible cable member which is secured at one end to the base of the seat and is looped through an eyelet formation of the actuating member of the switch and secured at an opposite end to a spring which is engaged at the rear base of the seat. When the spring sags due to load, the actuating member is moved to a position in which the cable tension is relaxed so that the actuating member can be moved backwardly to an opposite operating position by a return spring. The initial tension and actuation of the switch actuating member, when the seat is not loaded, can be so adjusted that the switch is operated even when only a slight load on the pull switch is effective. Such a construction makes it possible to reliably maintain the control position even when the load changes and even through the spring suspension sags at distinct locations.

The pull switch is advantageously arranged to control an indicating or control circuit which has a make or break or changeover contact depending upon the type of monitoring circuit which is employed. The response sensitivity of the switch device of the invention is considerable when the draw switch is connected to the spring suspension of the seat at the central area of the seat. Since the spring suspension greatly changes during the sagging of the seat itself, the securing of the pull switch is so designed that the pull switch is fixedly connected to one point and displaceable at a second point to the spring mounting of the seat.

The coupling between the switch actuating member and the cable is effected by forming the actuating member as an eyelet through which the tension cable extends. The cable is secured at respective ends to the seat frame through a spring connection. For this purpose, one end is advantageously connected to a spring member, and the opposite end is formed with an abutment which may be engaged between two legs of a forked guide portion of an angle plate which is secured to the base frame of the seat. The spring, which is connected to the cable, is equal to the length of the cable when the pull switch is displaced. The cable is advantageously secured at one end of the forward part of the seat and its opposite end to the rear part of the seat.

The response of the device to unevenly distributed loads on the seat may be improved if a plurality of pull switches are mounted at various locations on the underside of the seat on the spring suspension. Each switch is actuated by a separate tension cable and, preferably, all of the pull switches are connected in parallel. An identical effect may also be achieved if the underside is provided preferably in the central area of the spring suspension with a pull switch having an actuating member which is kept in the operative position by a plurality of differently extending cables. In any case, a comparatively large area of the seat is engaged, and the switch device is operated in the event of any sagging.

Accordingly, it is an object of the invention to provide an improved device for indicating a load on a seat, particularly a passenger seat of an automobile, which comprises, an indicator switch adapted to be connected to the underside of a spring suspension of a seat and which has an actuating member which is held in one actuating position by a tension cable and which is releasable by movement of the spring suspension with the switch by the loading of the seat to release the tension on the cable.

A further object of the invention is to provide an actuating device for indicating a load on a vehicle seat which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWING

The only FIGURE of the drawing is a partial longitudinal sectional view of an automobile vehicle seat constructed in accordance with the invention.

GENERAL DESCRIPTION OF THE PREFERRED EMBODIMENT

Referring to the drawing in particular, the invention embodied therein comprises, an automobile vehicle having a seat, generally designated 50, with a rigid base frame 14, and with a generally U-shaped spring suspension frame 12, having a front leg portion 12a and a rear leg portion 12b and an intermediate horizontal portion 12c. The spring suspension 12 comprises a spring bar frame which is covered by a seat cover 10 and by upholstery 11, and it includes spring bars 22 at the horizontal portion 12c.

In accordance with the invention, a load is indicated by the flexure of the spring suspension 12, and this is effected by means of a pull switch 16, having an actuator member 23 formed as an eyelet which is held in one operating position, for example, an actuated position, by a cable 15, but which may be returned to an opposite operating position, that is, for example, a deactuated position, by a return spring 52 of the switch.

Means are provided for applying a tension to the cable 15, which in the embodiment shown, comprises a securing clip 19 which is secured to an end bar member 20 of the spring suspension 12 at the rear end of the seat at the base of the leg portion 12b. Cable 15 is secured to a draw spring 54, which is carried by the securing clip 19, and the opposite end of the cable 15 is provided with an abutment 18 which fits into a slot defined between legs 17a, 17a of a forked end of an angle plate member 17 which is secured to the rigid tubular seat frame 14. The seat frame 14 is adapted to be secured to the floor of the vehicle. The seat back 13, which is shown in the drawing, is secured to the seat at the rear end above the rear leg 12b.

In accordance with a feature of the invention, the pull switch 16 is secured to the spring bars 22 of the spring suspension 12 on the underside of the horizontal portion 12c. The pull switch 16 includes a housing having a rigid rear extension 16a which is clamped to the underside of the spring bars 22 by a clamping sleeve 21. The other end of the switch housing includes a hook-shaped part 24 which is engaged over the spring bars 22 and which defines a displaceable end which may move backwardly and forwardly, but which flexes inwardly and outwardly with the flexure of the spring suspension 12 under loading and unloading. The displaceable fixing point of the hook-shaped end 24 is necessary, since the space between the two spring bars 22, 22, increases when the surface of the seat is loaded, and the associated sagging occurs.

The operation of the device is as follows:

When the seat surface is not loaded, the resiliently clamped cable 15 draws the actuating member 23 of the pull switch 16 downwardly to hold the actuating member in an actuated switch position. When the seat is loaded, the resilient seat sags, and consequently, so does the spring suspension 12. The pull switch 16 is moved downwardly with the sagging springs, and the tension of the cable 15 is reduced so that the actuating member 23 of the switch 16 is released. This actuating member 23 is released even with a slight sagging of the seat surface, and it is returned by the return spring 52, which urges it in an opposite direction when the tension on the cable 15 is overcome. The switching operation of the pull switch 16 is transmitted to a monitoring circuit (not shown) by means of suitably operated contacts.

In some instances, it is desirable to use more than one cable 15 to control the operation of the actuator 23. These cables may be oriented to extend to various locations of the seat frame. In the same way, a plurality of pull switches may advantageously be used on the underside of each seat and, in such a case, each actuating member of the switches would be connected to a separate cable 15, and the monitoring circuit would be connected to all of the switches in parallel.

While a specific embodiment of the invention has been shown and described in detail to illustrate the application of the principles of the invention, it will be understood that the invention may be embodied otherwise without departing from such principles.

What is claimed is:

1. A device for indicating a load on a seat, particularly a passenger seat of an automobile, comprising a seat having an interior spring suspension with a central raised area and a leg portion at each end, an indicator switch depending from said spring suspension in the central area of said seat and having an actuator member, means biasing said actuator member to one switch position, a cable connected to said actuator intermediate its length and having one end connected to the lower end of one of said leg portions and an opposite end connected to the lower end of the other of said leg portions on the opposite end of said seat, and tensioning means for biasing said cable in a direction opposite to said biasing means to urge said actuator to a second switch position when said spring suspension is unloaded, said indicator switch being movable with said spring suspension when it is loaded in a direction to counter said tensioning means on said cable to permit said biasing means to move said actuator to the first switch position.

2. A device for indicating a load on a seat, according to claim 1, including means for rigidly connecting said indicator switch at its one end and displaceably holding said indicator switch to said suspension at its opposite end.

3. A device for indicating a load on a seat, according to claim 1, wherein said actuator member comprises an eyelet, said cable extending through said eyelet, said tensioning means comprising the engagement of said cable with respective ends of said seat.

4. A device for indicating a load on a seat, according to claim 1, wherein, at least one end of said cable includes an abutment, an angle plate mounted within said seat and having a slot smaller than said abutment, said cable being engaged in the slot with the abutment preventing passage therethrough.

5. A device for indicating a load on a seat, according to claim 1, wherein said leg portions include a front leg portion and a rear leg portion being arranged in spaced relationship and extending generally vertically with an intermediate horizontal seat portion extending therebetween, said cable being connected at its respective ends to said front end portion and said rear end portion of said seat, respectively.

6. A device for indicating a load on a seat, according to claim 1, including a plurality of indicator switches mounted on said spring suspension at spaced locations.

7. A device for indicating a load on a seat, according to claim 1, including a plurality of cables connected to said indicator switch.

8. A device for indicating a load on a seat, according to claim 1, wherein said biasing means comprises a return spring of said switch.

9. A device for indicating a load on a seat, according to claim 1, wherein said switch includes a housing having a forwardly extending rigid member, a clamping sleeve extending around said member and secured to said spring suspension, said housing having an opposite hook-shaped end which is hooked over said spring suspension.

* * * * *